United States Patent [19]

Wells

[11] Patent Number: 5,003,300
[45] Date of Patent: * Mar. 26, 1991

[54] HEAD MOUNTED DISPLAY FOR MINIATURE VIDEO DISPLAY SYSTEM

[75] Inventor: Benjamin A. Wells, Newton, Mass.

[73] Assignee: Reflection Technology, Inc., Waltham, Mass.

[*] Notice: The portion of the term of this patent subsequent to Jun. 19, 2007 has been disclaimed.

[21] Appl. No.: 200,692

[22] Filed: May 31, 1988

Related U.S. Application Data

[63] Continuation-in-part of Ser. No. 78,295, Jul. 27, 1987, Pat. No. 4,934,773, and a continuation-in-part of Ser. No. 200,645, May 31, 1988, Pat. No. 4,902,083.

[51] Int. Cl.$^5$ ............................................. G09G 3/02
[52] U.S. Cl. .................................. 340/705; 340/980; 358/103; 350/6.5
[58] Field of Search ............... 340/705, 980; 358/103, 358/104, 109; 350/174, 6.5, 6.6; 353/11, 12, 13, 14

[56] References Cited

U.S. PATENT DOCUMENTS

| | | |
|---|---|---|
| Re. 28,847 | 6/1976 | Vizenor . |
| D. 295,411 | 4/1988 | Cho et al. ............................ 379/433 |
| 1,756,232 | 4/1930 | Arnaud ............................... 358/208 |
| 1,766,885 | 6/1930 | Dauvillier ........................... 358/208 |
| 1,979,296 | 11/1934 | Sweeney ............................. 358/208 |
| 2,681,588 | 6/1954 | Dyner . |
| 2,958,802 | 11/1960 | Hammer et al. .................... 250/332 |
| 2,989,643 | 6/1961 | Scanlon .............................. 250/230 |
| 3,059,519 | 10/1962 | Stanton . |
| 3,079,555 | 7/1963 | Daschke . |
| 3,170,979 | 2/1965 | Baldwin et al. .................... 340/705 |
| 3,205,303 | 9/1965 | Bradley . |
| 3,224,332 | 12/1965 | Mikusch ............................. 350/453 |
| 3,278,746 | 10/1966 | Fiat .................................... 250/253 |
| 3,287,559 | 11/1966 | Barnes ............................. 250/316.1 |
| 3,387,140 | 6/1968 | Roth et al. . |
| 3,446,980 | 5/1969 | Meier ................................. 250/234 |
| 3,532,408 | 10/1970 | Dostal ................................ 350/486 |
| 3,609,485 | 9/1971 | Dostal . |
| 3,652,856 | 3/1972 | Paul . |
| 3,671,766 | 6/1972 | Howe . |
| 3,704,342 | 11/1972 | Stoddard et al. . |
| 3,742,238 | 6/1963 | Hoffman, II . |
| 3,760,181 | 9/1973 | Daly et al. ......................... 250/332 |
| 3,781,559 | 12/1973 | Cooper et al. . |
| 3,833,300 | 9/1974 | Rymes . |
| 3,846,784 | 11/1974 | Sinclair ............................. 340/814 |
| 3,923,370 | 12/1975 | Mostrom . |
| 3,958,235 | 5/1976 | Duffy . |
| 4,026,641 | 5/1977 | Bosserman . |
| 4,081,209 | 3/1978 | Heller et al. . |
| 4,129,887 | 12/1978 | Michon ............................. 358/213 |

(List continued on next page.)

FOREIGN PATENT DOCUMENTS

| | | |
|---|---|---|
| 0121927 | 12/1983 | European Pat. Off. . |
| 0030677 | 3/1981 | Japan ................................. 340/781 |
| 57-114116 | 7/1982 | Japan ................................. 350/6.6 |
| 8606238 | 4/1985 | PCT Int'l Appl. . |

OTHER PUBLICATIONS

Reid, D. A. T., "Micro-Display," 6/79, IBM Technical Disclosure Bulletin, vol. 22, No. 1, p. 362.
Upton, Hubert W. and Goodman, James R., "Eyeglass Heads-Up Display," 51D 81 Digest, pp. 48,49.

(List continued on next page.)

Primary Examiner—Alvin E. Oberley
Assistant Examiner—M. Fatahiyar
Attorney, Agent, or Firm—Wolf, Greenfield & Sacks

[57] ABSTRACT

A head mounted display for presentation of video information includes a virtual raster display unit, an attachment mechanism for attaching the display unit to the head of the user, a support member connected to the attachment mechanism for supporting the display unit within the user's field of vision, and a remote signal source for providing power, timing, control signals and display information to the display system. The head attachment mechanism can be symmetrically designed to allow positioning of the display unit in front of either of the viewer's eyes, or the attachment mechanism may be eliminated completely and the support member and display unit attached directly to a conventional helmet or the user's eyeglasses.

35 Claims, 5 Drawing Sheets

U.S. PATENT DOCUMENTS

| | | | |
|---|---|---|---|
| 4,189,747 | 2/1980 | Funari | 358/126 |
| 4,213,146 | 7/1980 | Maiman . | |
| 4,225,862 | 9/1980 | Johnson | 340/755 |
| 4,232,196 | 11/1980 | Filippi . | |
| 4,248,495 | 2/1981 | Minoura . | |
| 4,251,126 | 2/1981 | Minoura et al. | 350/6.6 |
| 4,311,999 | 1/1982 | Upton et al. | 340/755 |
| 4,340,888 | 7/1982 | Seroskie | 340/755 |
| 4,364,636 | 12/1982 | Ellis | 350/174 |
| 4,415,065 | 11/1983 | Sandstedt | 340/825.44 |
| 4,439,157 | 3/1984 | Breglia et al. | 350/174 |
| 4,443,075 | 4/1984 | Crane | 351/209 |
| 4,457,580 | 7/1984 | Klose | 350/6.91 |
| 4,470,044 | 9/1984 | Bell | 340/755 |
| 4,538,181 | 8/1985 | Taylor . | |
| 4,618,860 | 10/1986 | Mori | 340/825.44 |
| 4,632,501 | 12/1986 | Glynn | 350/6.6 |
| 4,636,866 | 1/1989 | Hattori | 340/705 |
| 4,661,659 | 4/1987 | Nishimura | 379/99 |
| 4,676,582 | 6/1987 | Kato et al. | 350/65 |
| 4,708,420 | 11/1987 | Liddiard | 350/6.6 |
| 4,720,781 | 1/1988 | Crossland et al. | 310/825.35 |
| 4,732,440 | 3/1988 | Gadhok | 350/6.6 |
| 4,752,129 | 6/1988 | Izumi et al. | 356/328 |
| 4,753,514 | 6/1988 | Kubik | 350/174 |
| 4,795,223 | 1/1989 | Moss | 353/14 |

OTHER PUBLICATIONS

Upton, Hubert W. and Goodman, J. R., "Eyeglass Heads-Up Display," Proceedings of the 51D, vol. 23/2, 1982, pp. 77–80.

Title "IRTV-445 Patented Scanning System".

Invention Disclosure, Fritzel et al., "Reactionless Mirror Drive," Hughes Aircraft Company, May 1975.

OKI Technical Review 123, vol. 52, Publication "High-Resolution Display Using Light-Emitting Diode Arrays," Abiko et al., 1/86, pp. 46–50.

Invention Disclosure, "Beam Stabilization and Auto Alignment System," Hughes Aircraft Company, 9/76.

"Conversational Terminal," Cermetek Microelectronics, 4/87.

"Lifestyle Personal Communicator," AdioBionics Inc., Hearing Instruments, vol. 36, No. 1, 1985.

Machine Design, 6/12/86, "Lineman's Handset Answers All Question," p. 46.

Leon, N. M., "Projected Image Display," 6/79, IBM Technical Disclosure Bulletin, vol. 22, No. 1, pp. 363–365.

HEAD MOUNTED DISPLAY FOR MINIATURE VIDEO DISPLAY SYSTEM

This application is a continuation-in-part of U.S. patent application Ser. No. 07/078,295, filed July 27, 1987, now U.S. Pat. No. 4,934,773, and U.S. patent application Ser. No. 07/200,645, filed May 31, 1988, now U.S. Pat. No. 4,902,083.

FIELD OF THE INVENTION

The present invention relates to portable visual display systems and, in particular, to head-mounted displays which allow a miniature visual display system to be held on the head of a viewer so as to place display within the viewer s field of vision.

BACKGROUND OF THE INVENTION

There are many head-mounted visual display devices currently in existence. The majority of these devices have been developed for use in conjunction with military applications. For example, U.S. Pat. Nos. 3,059,519; 3,205,303; 3,383,300; 3,870,405; 3,923,370; 4,040,744; 4,081,209; 4,156,292 and Re. 28,847 all disclose "heads up" display devices for military applications in which reflective devices attached to a user's helmet display imaqes which are qenerated by a small cathode ray tube (CRT) Due to the presence cf a relatively large CRT, the majority of the devices disclosed in the above-listed patents are bulky and difficult to use even in military applications where a helmet is commonly worn and user movement is often restricted. Such designs have no practical value for consumer applications where the user environment is not as restricted.

Relatively little innovation has been made in the way of consumer head-mounted video displays. U.S. Pat. No. 4,026,641 discloses a CRT qenerated head display, similar to the above mentioned patent, which suffers from the same limitations, namely impractical, bulky design. More recently, U.S. Pat. No. 4,636,866 discloses a personal liquid crystal display (LCD), device in which remotely qenerated video signals are projected via LCD screens positioned in front of the user's eyes in a helmet-visor configuration The above device uses a light-transmissive LCD screen fixed within the helmet-visor structure. The helmet is necessary in order to reduce ambient light which would make the LCD display difficult or impossible to observe, but the helmet completely restricts the user s field of vision to the imaqes projected on to the LCD screen, leaving the user effectively blind to the outside environment. This limitation is unacceptable for most business, medical, industrial and consumer applications and appears suited for only purely entertainment purposes.

From the above discussion, it appears that the size and nature of the display used to present information to the user is directly related to the practicality and useful applications of a head-mounted display device. Thus far, CRT and LCD devices have proven to have limited applicability to head-mounted devices.

It is therefore an object of the present invention to provide a head-mounted display device which uses display technology which can be implemented in a compact space-efficient manner so as not to occupy a majority of the user s field of vision.

It is a further object of the present invention to provide a head-mounted display device that provides a high quality, high resolution display of visual information and is suitable for a broad range of consumer, industrial, business, medical and military application.

It is still a further object of the present invention to provide a head-mounted display device which can be easily adjusted by the user to occupy all or part of the user's field of view according to individual preference.

It is yet a further object of the present invention to provide a head-mounted display device that is easily retractable from the viewer's field of vision and which can be conveniently positioned in front of either of the viewer's eyes.

It is a further object of the present invention to provide a head-mounted display which may be used while wearing eyeglasses.

It is another object of the present invention to provide a head-mounted display device that not only displays visual information but is capable of sending and receiving audio signals.

SUMMARY OF THE INVENTION

According to the present invention, a head-mounted display for presentation of video information is provided that comprises a virtual raster visual display unit, an attachment mechanism to secure the display unit to head of the user within the user's field of vision, a remote electronics pack which provides power, display information, timing and control signals for the display system.

The display unit of the present invention is an electromechanical scanning system in which a line of light-emitting devices is modulated with the information to be displayed. The illuminated line is converted into a raster by means of an oscillating mirror thereby generating a virtual raster image. These latter devices have the advantage that a full "page" display can be created from a much smaller number of light-emitting devices than is necessary to generate a normal full page real image.

In one embodiment of the present invention, the elements of the above-described display system are housed in a light-tight box which is attached to a rigid support member by a ball joint or a hinged joint. The rigid support member is pivotally secured to a head attachment with an extendible ball joint. The head attachment is comprised of a semi-rigid U-shaped member which clasps the ides and back of the head. An adjustable strap is pivotally attached to each side of the U-shaped member and the strap traverses the top of the viewer's head to further secure the head attachment. Provisions are further provided for extending the active length of the rigid support member to accommodate varying head sizes.

This latter arrangement allows the viewer to adjust the position of the display within his field of vision to suit his individual preference and, further, the arrangement allows the user to easily move the display out of the field of vision when he does not desire to view the display. This latter arrangement further allows the display to be used by persons who may be wearing eyeglasses. Such an arrangement also allows the display to be repositioned if, in addition to viewing the display, the viewer must perform some other task which requires depth perception. In this case, the viewer may position the display slightly below his normal line of sight, in approximately the same location that a bifocal lens would be located. Then the viewer can either look down to see the display or look up and over the display to concentrate on the alternative task.

In some embodiments, the support member, display and head attachment are symmetrical and the viewer may switch the display from eye to eye by merely rotating the apparatus 180°, and readjusting the strap and support member angular positions. In other embodiments, the support and display are symmetrical, but the head attachment is not. In this latter case, the head attachment has a releasable mounting mechanism which allows the support to be removed from one side of the head attachment and reattached on the other side In either case, a switch is provided for electronically inverting the virtual imaqes of the display system so as to prevent the imaqes from appearing inverted when the support member is changed from one side of the viewer's head to the other.

In some embodiments, the remote signal source which may be a computer, pocket calculator or a radio wave transmitter, and which provides power, timing and driving signals necessary for driving the display, and a source of video display information is housed remotely in a small compact unit which may be attached to the user's belt or waist and which connects to the display system through a conventional electric cable running from the remote signal unit to the end of the support member. In other embodiments, the signal source may be housed in the display box.

In some embodiments, the display system includes means for adjusting the brightness of the light-emitting devices in the scanning system. This may be performed manually in accordance with the user's preference by means of an intensity adjustment on either the display system housing, supporting member or remote signal unit. Alternatively, the brightness adjustment may be performed in accordance with a measurement of ambient light of the user's environment, which measurement is made by means of a photoelectric cell and supporting circuitry.

In another embodiment of the present invention, the display system housing and support member is directly attachable to the conventional motorcycle or pilot's helmet. One end of the support member is pivotally attached to a side wall of the helmet. In this embodiment, the support arm is detachable allowing the positioning of the display system on either side of the helmet The remote signal generating circuitry may again be housed in a compact unit which is attachable to the belt of a user and which connects to the display system via a conventional electrical cable. The remote signal means may also be housed within the helmet structure itself if a custom-designed helmet is available.

In yet another embodiment of the present invention, the head attachment means secured to the user's head comprises the user's eyeglasses In this embodiment, the rigid support member attaches directly to the user's eyeglass frames or the support member may be eliminated completely and the display system housing attached directly over the one lens of the viewer's eyeglasses. The remote signal circuitry in this embodiment is again housed in a compact unit which is attached to the user's belt or waist.

In another embodiment of the present invention, a head-mounted display system is constructed for viewing three-dimensional information. In this embodiment, two display systems and two rigid support arms are positioned on either side of the viewer's head and adjustably connected to form a unit that is similar to a conventional eyeqlass frame. An adjustable joint between the two display units allows precise positioning of the displays in front of each eye. In this case, the remote signal source which supplies the display systems with power timing and drive signals is constructed to supply stereoscopically formatted video information.

DETAILED DESCRIPTION OF THE PREFERRED EMBODIMENTS

Figure 1:
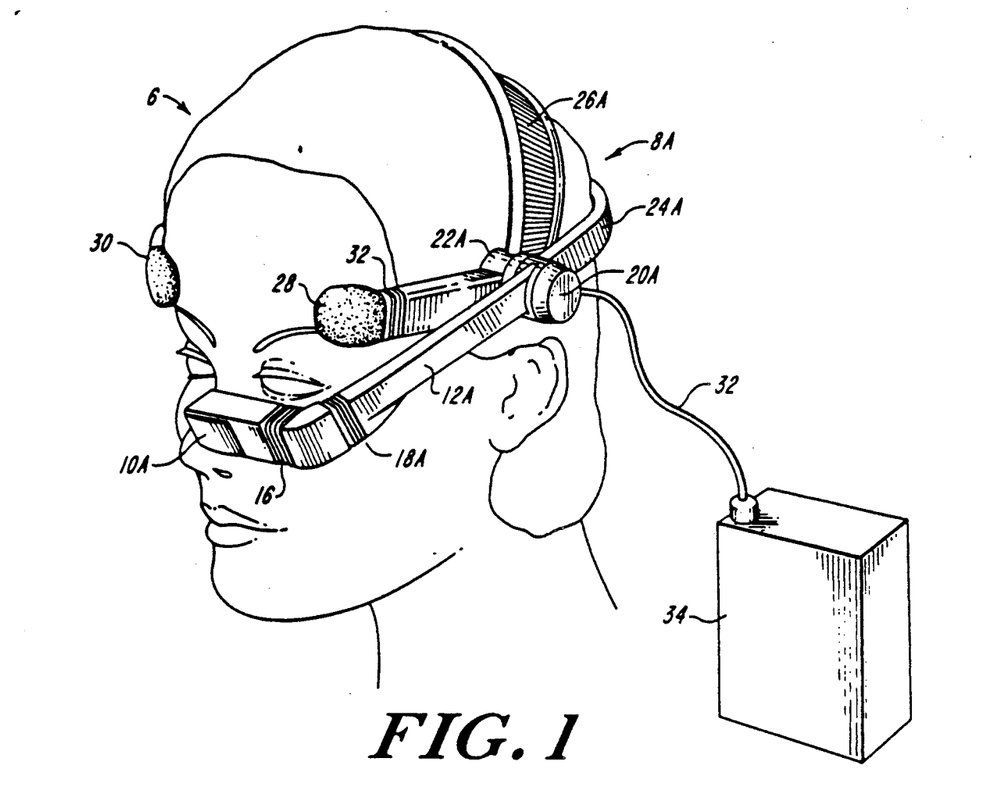
FIGS. 1 and 3 illustrate preferred embodiments of the present invention, with the display system and support member attached to the left side of the user's head.

Referring to the drawing and, in particular, to FIG. 1, a head-mounted display 8A is positioned about user's head 6 in accordance with one preferred embodiment of the present invention. The elements of the miniature video display system not shown in FIG. 1 are housed in light-tight box 10A. Light-tight box 10A completely surrounds the elements of the miniature video display system preventing ambient light from the user's environment from permeating the box housing except for a single opening (not shown) from which the virtual imaqes produced by the system can be viewed. In the preferred embodiment, box 10A is designed to be relatively small. For example, in one illustrative embodiment, the box would be approximately 1" by 3" by 1¼". The opening through which the imaqes is viewed is square with sides measuring approximately ¾".

Box 10A is attached to support member 12A by a hinqe joint 16. Hinqe joint 16 is made of either metal or plastic, and incorporates a friction device to hold the hinge in position. Hinge joint 16 pivots around a substantially vertical axis allowing box 10a to be moved relative to the viewer's eye according to his preference. Hinge joint 16 is covered by a stretchable material, such as corrugated rubber or plastic, which accommodates the hinge motion.

Support member 12A includes a hinge joint 18A. Support member 12A attaches to hinge joint 16, at the wide end of support member 12A. The end of support member 12A is connected to the main body of support member 12A by hinge joint 18A. Hinge joint 18A is identical in structure to hinge joint 16 Hinge joint 18A pivots about a horizontal axis which is substantially parallel to box 10A thereby allowing the angular location of box 10A to be adjusted according to user preference.

In a preferred embodiment, support member 12A is made of a durable material such as injection molded plastic and contains a hollow portion for housing an electrical or fiber optic cable 32 which carries the drive, power, timing and information signals from the remote signal source to the display system. The narrow end of support member 12A is secured to head attachment 24A by a ball joint 20A.

In a preferred embodiment, the narrow end of support member 12A is inserted into a vertical hole in ball joint 20A. Ball joint 20A, in conjunction with joint base 22A, allows motion of support member 12A, about a vertical and a horizontal axis through ball joint 20A and further allows adjustment of the active length of support member 12A. These motions allow the box 10A to be placed within the user's field of vision according to individual preference. Ball joint 20A further allows support member 12A and box 10A, to be moved out of the user's field of vision while remaining attached to head display 8A.

Head attachment 24A has a symmetrical design allowing the viewer to vary which eye the system is positioned in front of by inverting head display 8A and readjusting strap 26A and support member 12A accordingly. A switch 22A is further provided for electronically inverting the image produced by the display system to prevent the images from appearing inverted when the head display 8A is inverted and support member 12A is positioned on the opposite side of user's head 6. A focusing means 11A integrated within box 10A, is further provided.

Head attachment 24A is a semi-rigid U-shaped element which fits around the back and sides of the user's head 6. Integral within head attachment 24A is joint base 22A where pivotal joint 20A is attached. Head attachment 24A is terminated at both U-shaped ends by cushions 28 and 30 which are covered with a soft padding or spongy material. In a preferred embodiment cushions 28 and 30 are slightly curved to firmly clasp the perimeter of the user's forehead. In a preferred embodiment, head attachment 24A is made of a semi-rigid material such as plastic. A strap 26A which is attached to either side of head attachment 24A and traverses the top of the user's head 6 to further secure head display 8A. Strap 26A is preferably made of a soft flexible material which can be comfortably worn for extended periods.

Figure 2:
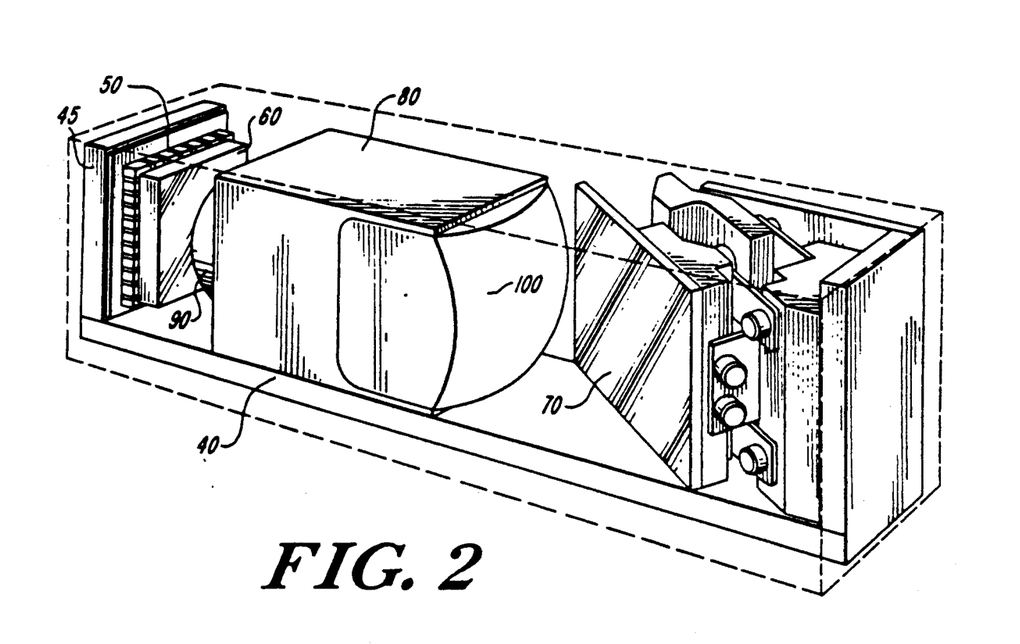
FIG. 2 is a perspective view of miniature visual display apparatus which, is suitable for use in the inventive head-mounted display.

FIG. 2 of the drawing shows a illustrative embodiment of a miniature display device which can be included in box 10 to develop a raster images for the display of information The miniature display device is of the type described in detail in copending U.S. patent application entitled *Miniature Video Display System*, filed on July 27, 1987 under Ser. No. 078,295 and assigned to the same assignee as the present invention (now U.S. Pat. No. 4,934,773) and allowed U S. patent application Ser. No. 07/200,645 (now U.S. Pat. No. 4,902,083) entitled *Low Vibration Resonant Scanning Unit for Miniature Optical Display Apparatus* filed on an even date herewith and assigned to the same assignee as the present invention. The operation and construction of the display device is discussed in detail in those applications, both of which are hereby incorporated by reference, and will not be repeated in detail herein for clarity. The display device consists of a base 40 on which the various optical components which comprise the display are mounted. At one end of base 40 is mounted the header block 45 in which an array of light-emitting devices 50 (such as light-emitting diodes) is attached. Generally, such an array may be a linear array comprising two rows of devices which are staggered in order to compensate for gaps between the devices. The devices are covered by a clear cover plate 60.

Light emitted from devices 50 is projected via mirror 70 by means of an optical system which consists of housing 80 in which are mounted lenses 90 and 100. In accordance with the principles set forth in the aforementioned U.S. patent application Ser. No. 078,295, the lens system projects an enlarged virtual image of array 50 via mirror 70.

As described in the above-described patent applications, mirror 70 is oscillated by an electromechanical drive motor (not shown). The oscillation of mirror 70, in turn, creates a raster images from linear array 50.

From the above discussion, head display 8A provides a means in which the user can comfortably and conveniently view visual information without having to reposition his head or sacrifice a majority of his field vision. Head display 8A further provides a means for moving the display system to and from the user's field of vision when desired.

Figure 3:
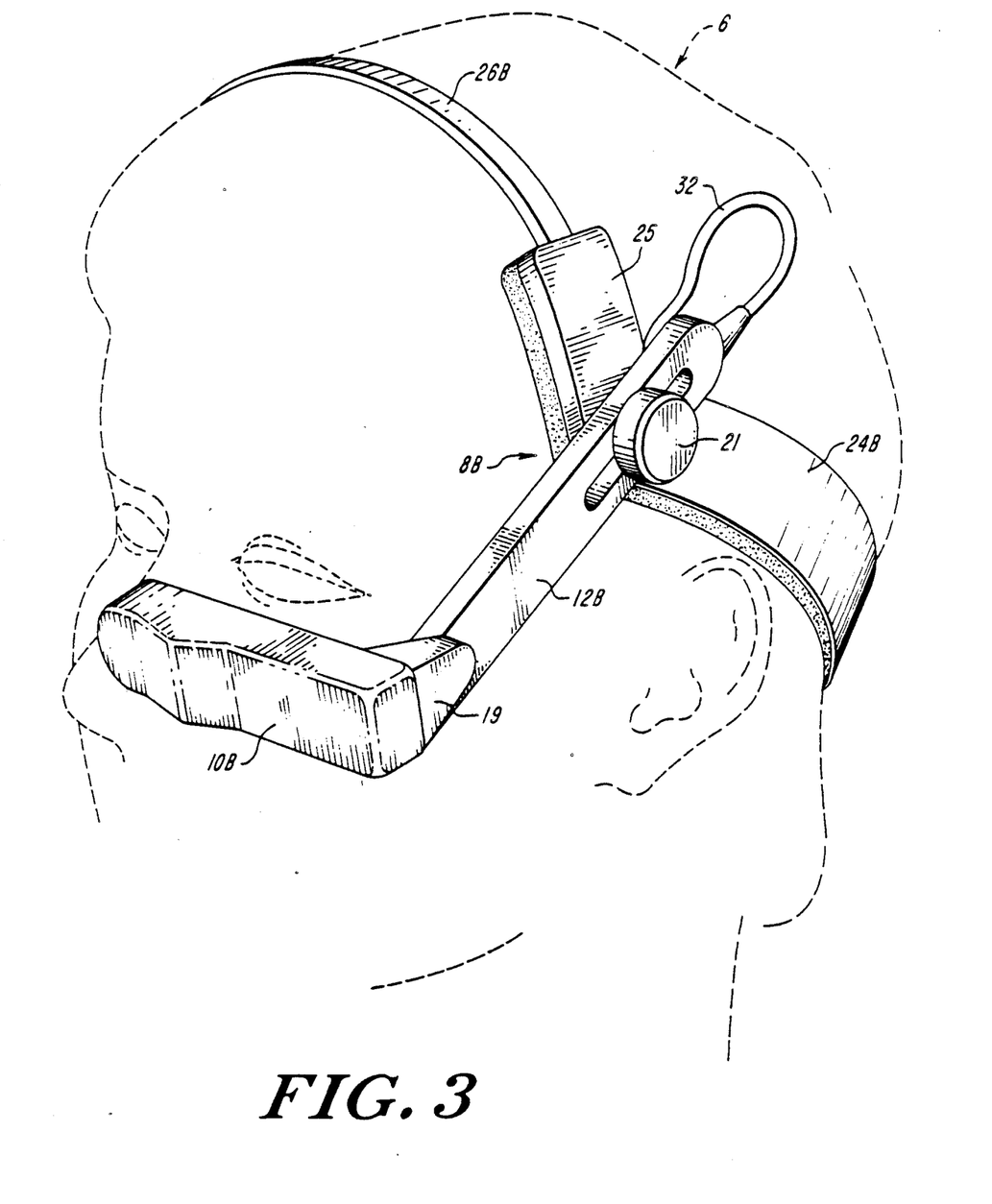

A second embodiment as shown in FIG. 3 is substantially similar to the first embodiment shown in FIG. 1. Hinged joints 16 and 18A are replaced by ball joint 19. In the current embodiment, the head attachment means 24B is comprised of a semi-rigid headband which is connected to headband ends 25 and flexible strap 26B. Headband ends 25 include means (not shown) for adjusting the length of flexible strap 26B. Head attachment means 24B includes provisions on the other side of head display 8B (not shown) for mounting ball joint 20B and support member 12B to allow positioning of the display system in front of either of the user's eyes.

Figure 4:
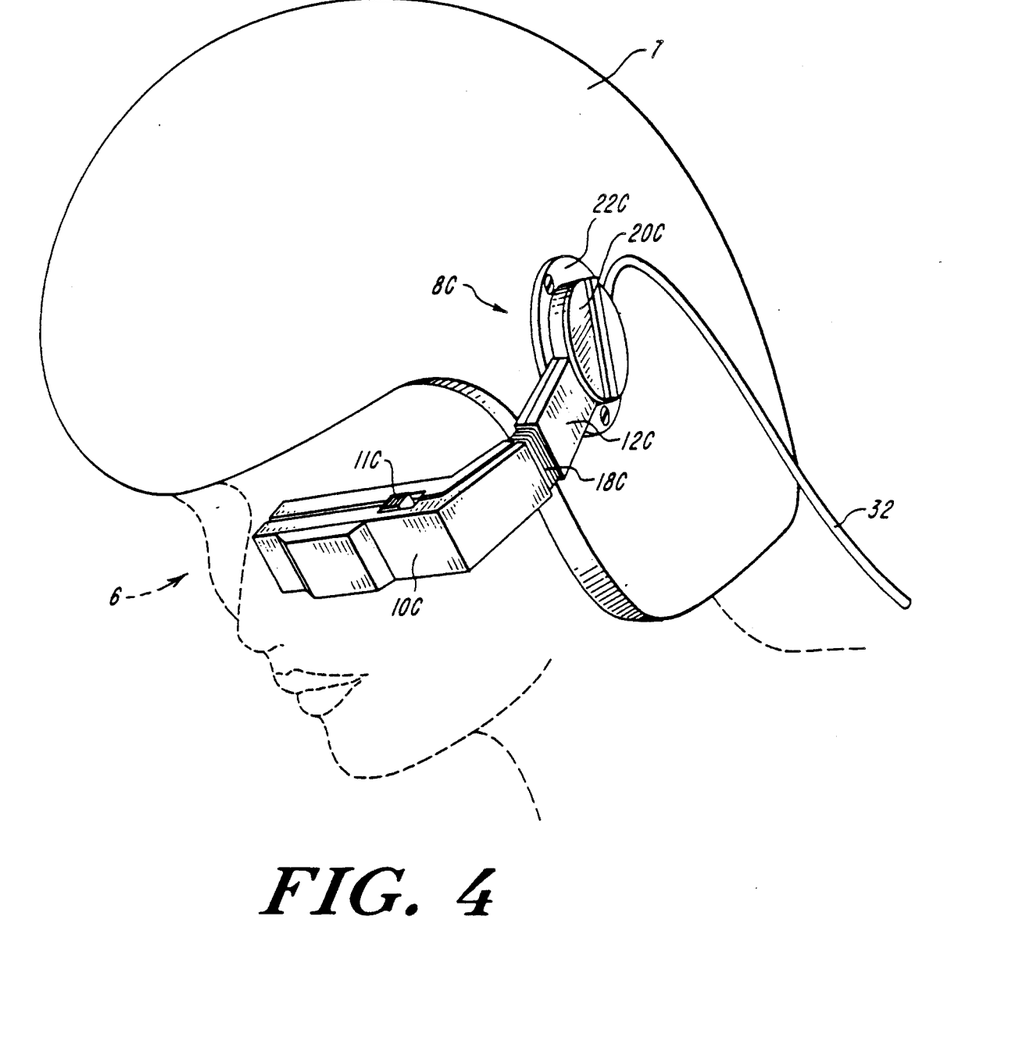
FIG. 4 illustrates another embodiment of the present invention in which the head attachment means of FIG. 1 has been replaced by a conventional helmet-like structure.

In a third embodiment of the present invention, as shown in FIG. 4, the head attachment means for the first two embodiments has been completely replaced by a conventional helmet 7, similar to a pilot's helmet or a motorcycle helmet, or even a child's toy helmet or mask device. In this embodiment, box 10C is attached to support member 12C via hinged joint 18C. Support member 12C is attached to helmet 7 by pivotal joint 20C and anchoring mounting 22C. With this embodiment, a viewer's existing helmet can be modified easily for use with the present invention. As in the other embodiments, electrical cable 32 connects the head display 8C with the remote signal source 34. In a slight variation of the present embodiment, the remote signal means can be integrated directly into helmet 7.

Figure 5:
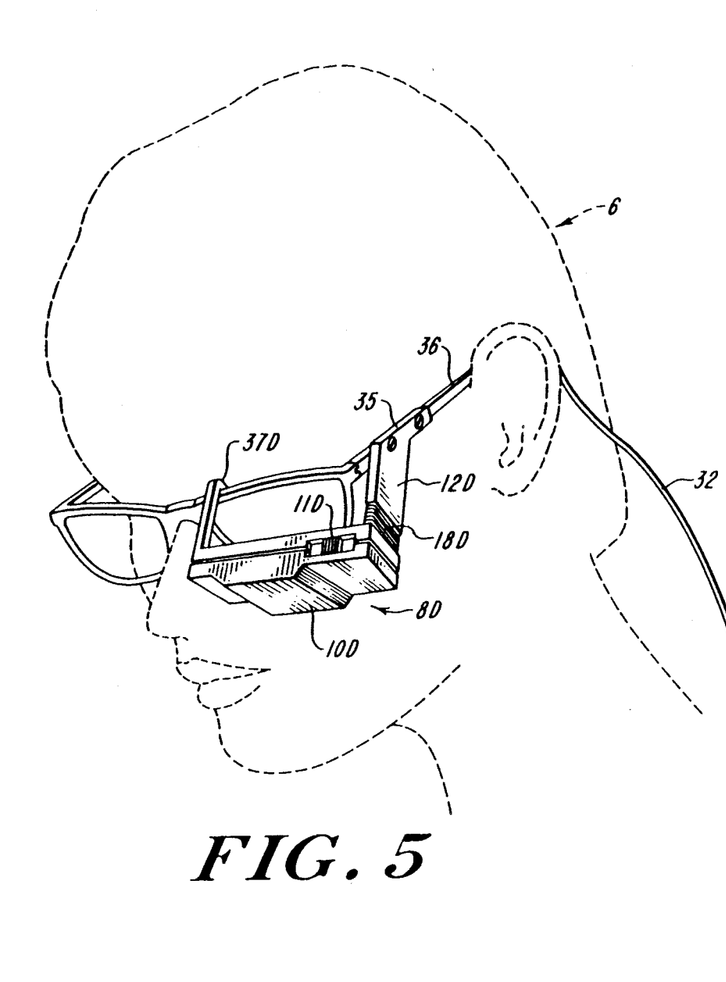
FIG. 5 illustrates another embodiment of the present invention in which the head attachment means of FIG. 1 has been replaced by a pair of conventional eyeglasses.

In a fourth embodiment of the present invention as shown in FIG. 5 box 10D is attached to a conventional pair of eye glasses 36. Box 10D is connected to support member 12D via hinged joint 18D. Support member 12D attaches to one side of eyeglasses 36 via bracket 35. A semi-rigid clipping device 37D further attaches near the bridge of the nose of eye glasses 36 to further secure head display 8D in position.

Figure 6:
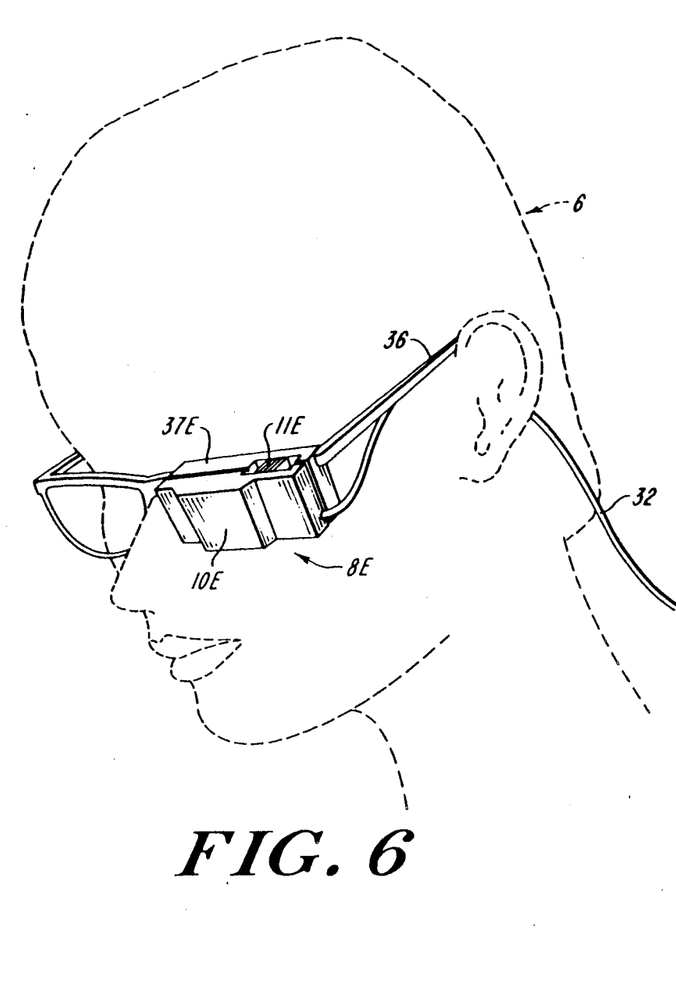
FIG. 6 illustrates another embodiment of the present invention in which the support member and head attachment means of FIG. 1 has been replaced by a pair of conventional eyeglasses.

In a fifth embodiment of the present invention which is similar to the fourth embodiment, as shown in FIG. 6, box 10E attaches directly to a pair of eye glasses 36. A clipping mechanism 37E secures box 10E directly against one lens of eyeglasses 36.

Figure 7:
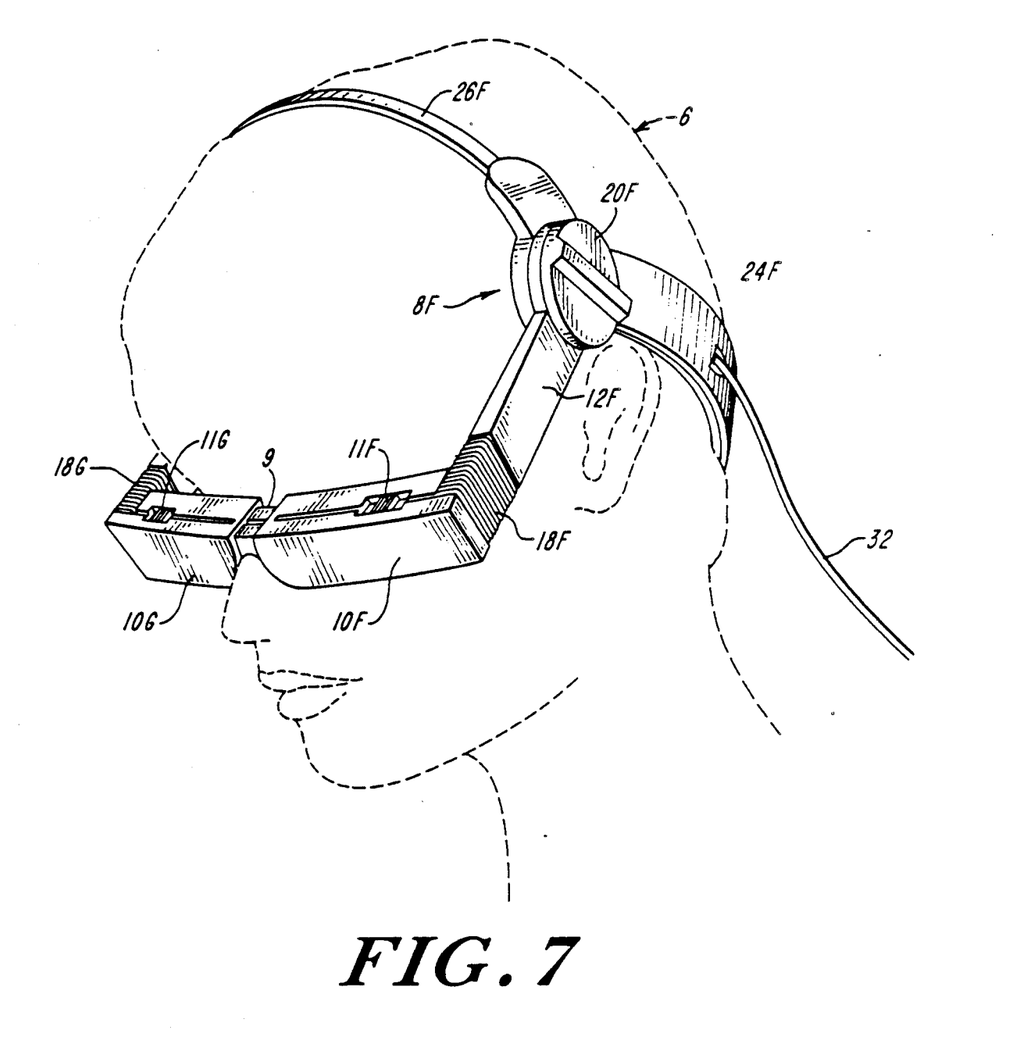
FIG. 7 illustrates another embodiment of the present invention which enables three dimensional viewing through the use of two individual display systems.

In a sixth embodiment, as shown in FIG. 7, two display systems are utilized for viewing information that is presented in a three-dimensional format. In this embodiment, two display systems housed in boxes 10F and 10G are attached and adjustably connected by extension joint 9. Extension joint 9 allows the display systems and the resulting virtual images to be precisely positioned in front of the viewer's eye pupils, allowing the viewer to take full advantage of the three-dimensional data which is displayed on the two display systems. In this embodiment, box 10F is connected to support member 12F by hinged joint 18F. Head attachment means 24F is similar in structure to head attachment means 24B of the second embodiment in FIG. 3. A pivotal joint 20F attaches support member 12F to attachment means 24F. As with the other embodiments, the remote signal source 34 is attached to head display 8F through electric cable 32.

In other embodiments (not shown) an audio receiver and/or transmitters may be integrated into remote signal source 34 with headphones and a microphone attached to head display 8 enabling the user to send and receive audio information or with a video receiver to receive remotely broadcast video information.

While the invention has been shown and described above with respect to various preferred embodiments, it will be apparent that the foregoing and other changes of form and detail may be made therein by one skilled in the art without departing from the spirit and scope of the invention

What is claimed is:

1. A head-mounted visual display system comprising:
   a number of independently illuminated light-emitting elements;
   imaging optics for creating an enlarged virtual image of said light-emitting elements;
   a mirror in which the reflection of said enlarged virtual image can be observed;
   means for repetitively moving said mirror through a predetermined range of movement to create a two-dimensional raster image of said reflection, said raster image being comprised of a number of picture elements, said number of picture elements being greater than said number of light-emitting elements;
   means for selectively illuminating said light-emitting elements;
   attachment means secured to the head of a user;
   support means connected to said attachment means and said display system for supporting said display system within said user's field of vision; and
   remote signal means connected to said display system for providing data necessary to drive said display system.

2. The head-mounted display of claim 1 wherein said light-emitting elements are aligned in a substantially one-dimensional array.

3. The head-mounted display of claim 1 wherein said support means include a means for adjusting the brightness of said light-emitting elements of said display system.

4. The head-mounted display of claim 3 wherein said means for adjusting the brightness comprises a photoelectric cell and support circuitry for sensing the ambient light of the user's environment and adjusting said brightness accordingly.

5. The head-mounted display of claim 1 wherein said support means includes means for adjusting the display-to-eye position according to user preference.

6. The head-mounted display of claim 1 wherein said support means includes a means for adding an additional external focus correction lens within the eye to-display distance.

7. The head-mounted display of claim 1 wherein said support means is attachable on either side of said attachment means enabling said display system to be positioned in front of either of user's eyes.

8. The head-memory display of claim 1 wherein said head attachment means includes means for inverting the virtual image produced by said display system to permit viewing of the virtual image when the display system is repositioned from one of a user's eyes to another.

9. The head-mounted display of claim 1 wherein said support means includes means for retracting said display system from user's line of sight, while said display system remains attached to said support means.

10. The support means of claim 9 wherein a pivotal joint connects said support means to said attachment means thereby allowing said support means and said display system to be displaced vertically out of user's line of sight.

11. The head-mounted display of claim 1 wherein all or part of said attachment means is comprised of user's eye glasses.

12. The attachment means of claim 11 wherein users prescription lenses can be integrated into said attachment means.

13. The head-mounted display of claim 1 wherein said attachment means comprises at least one strap positioned across the top or back of user's head.

14. The head-mounted display of claim 1 wherein said attachment means comprises a flexible headband fixable around the perimeter of said users head.

15. The head-mounted display of claim 1 wherein said attachment means comprises a cap or hat like structure fixable about the top of the user's head.

16. The head-mounted display of claim 1 wherein said attachment means comprises a conventional helmet like structure.

17. The head mounted display of claim 1 wherein said attachment means comprises a mask like structure.

18. The head-mounted display of claim 1 wherein said attachment means comprises safety goggles or glasses as used in an industrial application.

19. The head-mounted display of claim 1 wherein said remote signal source is coupled to said display system by an electrical or fiber optic cable.

20. The head-mounted display of claim 1 wherein said remote signal source is connected to said display system by a radio wave transmitter/receiver configuration, said transmitter located in said remote signal source, said receiver attached to said display system.

21. The head-mounted display device of claim 1 wherein said remote signal source is coupled to said display system by means of an optical data transmission link.

22. The head-mounted display device of claim 1 wherein said source of display information comprises a pocket calculator or computer.

23. The head-mounted display device of claim 1 wherein said source of display information comprises a video receiving device for receiving remotely generated display information from a television or video transmitter.

24. The head-mounted display device of claim 1 wherein said remote signal source further comprises an audio receiver and earphones for transmitting audio signal to the user.

25. The head-mounted display device of claim 1 wherein said remote signal means further comprises a microphone and audio transmission means for transmitting audio signals qenerated by the user.

26. The head-mounted display device of claim 1 wherein said remote signal means is attachable to the belt of the user.

27. The head-mounted display device of claim 1 wherein said remote signal means is secured to or integrated within said attachment means.

28. The head-mounted display of claim 1 wherein said support means is adjustably connected to said attachment means so as to enable positioning of said display system in front of either of viewer's eyes by repositioning said support means.

29. The head-mounted display device of claim 1 wherein said attachment means, said support means, said remote signal means and said display systems are integrated into a child's toy mask or helmet device.

30. A head-mounted binocular visual display system comprising:
 a pair of display systems, each of said display systems comprising:
 a number of independently-illuminated light-emitting elements;
 imaging optics for creating an enlarged virtual image of said light-emitting elements;
 a mirror in which the reflection of said enlarged virtual image can be observed;
 means for repetitively moving said mirror through a predetermined range of movement to create a two-dimensional raster image of said reflection, said raster image being comprised of a number of picture elements, said number of picture elements being greater than said number of light-emitting elements; and
 means for selectively illuminating said light-emitting elements;
 attachment means secured to the head of a user;
 support means, attached to said display systems, and further attached to said attachment means for supporting said display systems in front of viewer's eyes;
 means for horizontally aligning said display systems to achieve the desired inter-pupilary distance for binocular viewing; and
 remote signal means connected to said display systems for providing a source of video display information.

31. The head-mounted binocular visual display system of claim 30 wherein the light-emitting elements of each of said
 lay systems are aligned in a substantially one-dimensional array.

32. The head-mounted visual display system of claim 1 wherein said light-emitting elements are light-emitting diodes.

33. The head-mounted display system of claim 1 wherein said support means includes a light-tight box connected integrally with said support means for housing said light-emitting elements, said imaging optics and said mirror of said display system.

34. The head-mounted binocular visual display system of claim 30 wherein said light-emitting elements are light-emitting diodes.

35. The head-mounted binocular visual display system of claim 30 wherein the raster image created by a first of said display systems is different from the raster image created by the second of said display systems creating the illusion of three-dimensional viewing.

* * * * *

UNITED STATES PATENT AND TRADEMARK OFFICE
CERTIFICATE OF CORRECTION

PATENT NO.   : 5,003,300
DATED        : March 26, 1991
INVENTOR(S)  : Wells

It is certified that error appears in the above-identified patent and that said Letters Patent is hereby corrected as shown below:

Col. 8, line 5   - change "head-memory" to --head-mounted--.

Col. 9, line 2   - change "qenerated" to --generated--.

Col. 10, line 17 - change "lay" to --display--.

Signed and Sealed this

Thirteenth Day of October, 1992

Attest:

DOUGLAS B. COMER

*Attesting Officer*        *Acting Commissioner of Patents and Trademarks*